US007788396B2

(12) United States Patent
Rose (10) Patent No.: US 7,788,396 B2
(45) Date of Patent: Aug. 31, 2010

(54) SYNCHRONIZED DATA TRANSFER SYSTEM (75) Inventor: Steven W. Rose, Haliimaile, HI (US)

(73) Assignee: Interactive Content Engines, LLC, Honolulu, HI (US)

( * ) Notice: Subject to any disclaimer, the term of this patent is extended or adjusted under 35 U.S.C. 154(b) by 1139 days.

(21) Appl. No.: 10/999,661

(22) Filed: Nov. 30, 2004

(65) Prior Publication Data

US 2005/0114538 A1 May 26, 2005

Related U.S. Application Data

(63) Continuation-in-part of application No. 10/304,378, filed on Nov. 26, 2002.

(60) Provisional application No. 60/526,437, filed on Dec. 2, 2003, provisional application No. 60/333,856, filed on Nov. 28, 2001.

(51) Int. Cl.
*G06F 15/16* (2006.01)
*G06F 17/30* (2006.01)
*G06F 13/00* (2006.01)
*H04N 7/173* (2006.01)

(52) U.S. Cl. ........................ 709/232; 709/217; 709/231; 709/233; 707/10; 711/100; 711/114; 711/167; 725/92; 725/115; 725/117

(58) Field of Classification Search ................. 725/115, 725/117, 92; 711/100, 114, 167; 709/233, 709/217, 231, 232; 707/10
See application file for complete search history.

(56) References Cited

U.S. PATENT DOCUMENTS 4,349,875 A 9/1982 Tada
5,367,520 A 11/1994 Cordell (Continued)

FOREIGN PATENT DOCUMENTS

CA 2444438 10/2002

(Continued)

OTHER PUBLICATIONS

International Search Report from the Patent Corporation Treaty 4 pages.

(Continued)

*Primary Examiner*—Liangche A. Wang
*Assistant Examiner*—Tae K Kim
(74) *Attorney, Agent, or Firm*—Gary R. Stanford (57) ABSTRACT

A synchronized data transfer system including storage processor nodes, a backbone communication switch, multiple titles subdivided into subchunks and distributed across the nodes, a user process executed on a first node, a transfer process executed on a second node, and a management process executed on a management node. The user process sends a timestamped read request to request a corresponding subchunk. The transfer process sends a message to the management process for each received read request, where each message identifies source and destination nodes. The management process broadcasts transmit commands to initiate sequential transmit periods, receives the messages, and selects from among the received messages to ensure that each node sends and/or receives no more than one subchunk at a time. The management process sends a transmit request for each selected message, and the transfer process sends a subchunk identified by a transmit request in response to the transmit command.

24 Claims, 2 Drawing Sheets

U.S. PATENT DOCUMENTS

| | | | |
|---|---|---|---|
| 5,410,343 | A | 4/1995 | Coddington et al. |
| 5,421,031 | A | 5/1995 | De Bey |
| 5,473,362 | A | 12/1995 | Fitzgerald et al. |
| 5,521,631 | A | 5/1996 | Budow et al. |
| 5,528,282 | A | 6/1996 | Voeten et al. |
| 5,550,577 | A | 8/1996 | Verbiest et al. |
| 5,581,735 | A | 12/1996 | Kajitani et al. |
| 5,604,682 | A | 2/1997 | McLaughlin et al. |
| 5,606,359 | A | 2/1997 | Youden et al. |
| 5,608,448 | A | 3/1997 | Smoral et al. |
| 5,625,405 | A | 4/1997 | DuLac et al. |
| 5,671,377 | A | 9/1997 | Bleidt et al. |
| 5,678,061 | A | 10/1997 | Mourad |
| 5,712,976 | A | 1/1998 | Falcon, Jr. et al. |
| 5,721,815 | A | 2/1998 | Ottesen et al. |
| 5,732,239 | A | 3/1998 | Tobagi et al. |
| 5,761,526 | A * | 6/1998 | Sakakura et al. ............... 710/1 |
| 5,790,794 | A | 8/1998 | Dulac et al. |
| 5,805,804 | A | 9/1998 | Laursen et al. |
| 5,815,146 | A | 9/1998 | Youden et al. |
| 5,818,512 | A | 10/1998 | Fuller |
| 5,862,312 | A | 1/1999 | Mann et al. |
| 5,862,403 | A | 1/1999 | Kanai et al. |
| 5,892,915 | A | 4/1999 | Duso et al. |
| 5,915,094 | A | 6/1999 | Kouloheris et al. |
| 5,974,503 | A | 10/1999 | Venkatesh et al. |
| 5,996,089 | A | 11/1999 | Mann et al. |
| 6,005,599 | A | 12/1999 | Asai et al. |
| 6,032,200 | A | 2/2000 | Lin |
| 6,049,823 | A | 4/2000 | Hwang |
| 6,070,186 | A | 5/2000 | Nishio |
| 6,101,547 | A | 8/2000 | Mukherjee et al. |
| 6,128,467 | A | 10/2000 | Rege |
| 6,134,596 | A | 10/2000 | Bolosky et al. |
| 6,182,128 | B1 | 1/2001 | Kelkar et al. |
| 6,230,200 | B1 | 5/2001 | Forecast et al. |
| 6,266,817 | B1 | 7/2001 | Chadda |
| 6,275,898 | B1 | 8/2001 | DeKoning |
| 6,279,040 | B1 | 8/2001 | Ma et al. |
| 6,289,383 | B1 | 9/2001 | Rhine |
| 6,332,140 | B1 | 12/2001 | Rhine |
| 6,370,579 | B1 | 4/2002 | Partridge |
| 6,374,336 | B1 | 4/2002 | Peters et al. |
| 6,389,420 | B1 * | 5/2002 | Vahalia et al. ............... 707/8 |
| 6,401,126 | B1 | 6/2002 | Douceur et al. |
| 6,415,328 | B1 | 7/2002 | Korst |
| 6,415,373 | B1 * | 7/2002 | Peters et al. ............... 711/167 |
| 6,449,688 | B1 | 9/2002 | Peters et al. |
| 6,571,351 | B1 * | 5/2003 | Mitaru et al. ............... 714/6 |
| 6,604,155 | B1 | 8/2003 | Chong, Jr. |
| 6,834,326 | B1 * | 12/2004 | Wang et al. ............... 711/114 |
| 6,898,285 | B1 | 5/2005 | Hutchings et al. |
| 2002/0073172 | A1 | 6/2002 | Armstrong et al. |
| 2002/0138696 | A1 | 9/2002 | Kodama et al. |
| 2002/0157113 | A1 * | 10/2002 | Allegrezza ............... 725/115 |
| 2003/0046704 | A1 | 3/2003 | Laksono et al. |
| 2003/0088689 | A1 | 5/2003 | Alexander et al. |

FOREIGN PATENT DOCUMENTS

| | | |
|---|---|---|
| EP | 1107582 | 6/2001 |
| JP | 8328760 | 12/1996 |
| JP | 200151890 | 2/2001 |
| WO | WO00/58856 | 10/2000 |

OTHER PUBLICATIONS

Van Tassel, Joan et al. NTQ New Telecom Quarterly, The Evolution of the Interactive Broadband Server, Parts 1 and 2, 1996, 28 pages.

Rose, Steve; Video on Demand Playback Machine Investigation for ATC by Steve Rose, Viaduct Corp.; 1994; 18 pages.

Rose, Steve; Video on Demand Overview; 1994; 3 pages.

Rose, Steve ; Video on Demand: Current Status; 1994; 4 pages.

Santo, Brian; ATM may find use in video on demand; Electronic Engineering Times; 1994; p. 37; Maui, Hawaii.

Rose, Steve; Video on Demand and ATM—A Quick Overview; 1994; 2 pages.

CRC Electronics, Inc. / Model P-1000 / Videocassette Programmer (Pamphlet), CRC Electronics, Inc. / Model TD-100 / Time Delay Videotape Controller (Pamphlet), Capacity Plus (Pamphlet); 1994; 11 pages.

Harman, et al. "The Zebra Striped Network File System." Operating System Review, ACM New York, NY, US. vol. 27, No. 5, Dec. 1, 1993. pp. 29-43. XP000418681. ISSN: 0163-5980.

Kumar, M et al. "A High Performance Video Server for Broadband Network Environment." Proceedings of the SPIE—The International Society for Optical Engineering, SPIE. vol. 2667, Jan. 29, 1996. pp. 410-421, XP000675452.

Patterson, David A et al. "A Case for Redundant Arrays of Inexpensive Disks (RAID)." Sigmod Record, ACM, New York, NY, US. Jan. 1, 1988. pp. 109-116 XP000577756.

* cited by examiner

SYNCHRONIZED DATA TRANSFER SYSTEM

CROSS-REFERENCE TO RELATED APPLICATIONS

This application claims the benefit of U.S. Provisional Application No. 60/526,437 filed on Dec. 2, 2003, and is a continuation-in-part of U.S. patent application entitled "Interactive Broadband Server System" Ser. No. 10/304,378 filed Nov. 26, 2002, pending, which itself claims the benefit of U.S. Provisional Application No. 60/333,856 filed on Nov. 28, 2001, all of which having a common inventor, being commonly assigned, and being herein incorporated by reference for all intents and purposes.

BACKGROUND OF THE INVENTION

1. Field of the Invention

The present invention relates to interactive broadband server systems, and more particularly, to an interactive content engine that employs a synchronized data transfer system to facilitate delivering multiple simultaneous isochronous data streams at high speed.

2. Description of the Related Art

It is desired to provide a solution for the storage and delivery of streaming media content. An initial goal for scalability is from 100 to 1,000,000 simultaneous individual isochronous content streams at 4 megabits per second (Mbps) per stream, although different data rates are contemplated. The total bandwidth available is limited by the largest available backplane switch. The largest switches at the present time are in the terabit per second range, or about 200,000 simultaneous output streams. The number of output streams is generally inversely proportional to the bit rate per stream.

The simplest model of content storage is a single disk drive connected to a single processor which has a single network connector. Data is read from the disk, placed in memory, and distributed in packets, via a network, to each user. Traditional data, such as Web pages or the like, can be delivered asynchronously. In other words, there are random amounts of data with random time delays. Low volume, low resolution video can be delivered from a Web server. Real time media content, such as video and audio, require isochronous transmission, or transmission with guaranteed delivery times. In this scenario, a bandwidth constraint exists at the disk drive. The disk has arm motion and rotational latency to contend with. If the system can only sustain 6 simultaneous streams of continuous content from the drive to the processor at any given time, then the 7th user's request must wait for one of the prior 6 users to give up a content stream. The upside of this design is simplicity. The downside is the disk, which, as the sole mechanical device in the design, can only access and transfer data so fast.

An improvement can be made by adding another drive, or drives, and interleaving the drive accesses. Also, duplicate content can be stored on each drive to gain redundancy and performance. This is better, but there are still several problems. Only so much content can be placed on the local drive or drives. The disk drives, CPU, and memory are each single points of failure that could be catastrophic. This system can only be scaled to the number of drives the disk controller can handle. Even with many units, there is a problem with the distribution of titles. In the real world, everyone wants to see the latest movies. As a rule of thumb 80% of content requests are for just 20% of the titles. All of a machine's bandwidth cannot be consumed by one title, as it would block access to less popular titles stored only on that machine. As a result, the "high demand" titles would have to be loaded on most or all of the machines. In short, if a user wanted to see an old movie, that user might be out of luck—even though it is loaded in the system. With a large library, the ratio may be much greater than the 80/20 rule used in this example.

If the system were based on the standard Local Area Network (LAN) used in data processing, there would be other inefficiencies. Modern Ethernet-based TCP/IP systems are a marvel of guaranteed delivery, but include a time price caused by packet collisions and re-transmits of partially lost packets and the management needed to make it all work. There is no guarantee that a timely set of content streams will be available. Also, each user consumes a switch port and each content server consumes a switch port. Thus, the switch port count has to be twice the server count, limiting the total online bandwidth.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The architecture described herein accommodates individual components of varying capability to avoid an installation being limited to the point in time when the initial system purchase was made. The use of commodity components guarantees recent well proven technology, avoidance of sole sources, and the lowest cost per stream. Individual component failures are tolerated. In many cases, there is no noticeable change in behavior from a user's perspective. In other cases, there is a brief "self repair" cycle. In many cases, multiple failures may be tolerated. Also, in most if not all cases, the system can recover without requiring immediate attention, making it ideal for "lights out" operation.

Content storage allocation and internal bandwidth is automatically managed by Least Recently Used (LRU) algorithms which guarantee that the content in RAM cache and the hard drive array cache are appropriate to the current demand, and the backplane switch bandwidth is used in the most efficient manner. Bandwidth within the system is rarely, if ever, oversubscribed, so it is not necessary to discard or delay the transmission of packets. The architecture provides the ability to take full advantage of the composite bandwidth of each component, so guarantees can be met, and the network is private and under full control so even in a situation of unanticipated peak demand no data path is overloaded. Streams of any bit rate can be accommodated, but typical streams are expected to remain in the 1 to 20 Mbps range.

Asynchronous content is accommodated on an available bandwidth basis. Bandwidth may be reserved for the purpose if required by the application. Files may be of any size with a minimum of storage inefficiency.

Figure 1:
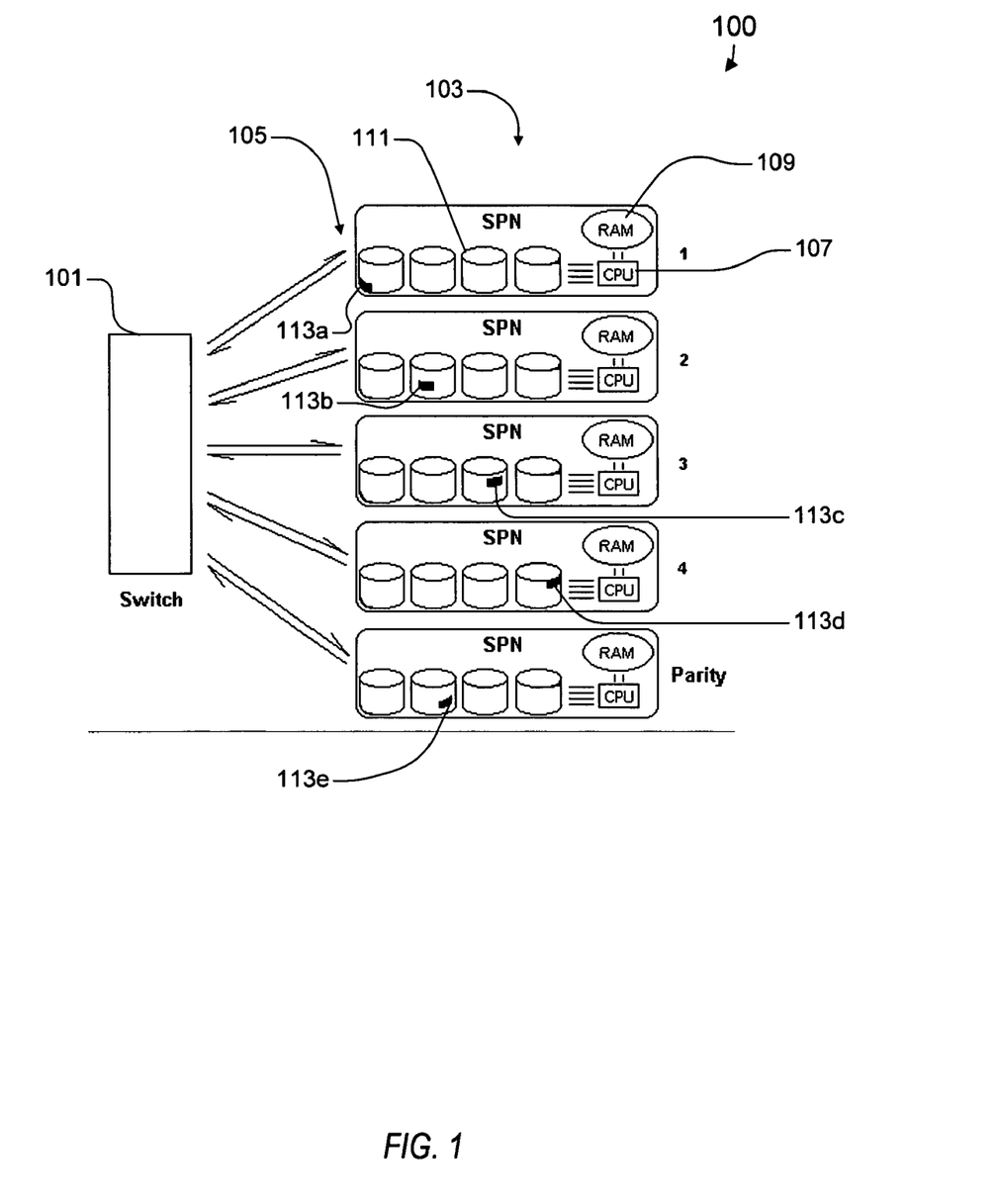
FIG. 1 is a simplified block diagram of a portion of an Interactive Content Engine (ICE) implemented according to an exemplary embodiment of the present invention.

FIG. 1 is a simplified block diagram of a portion of an Interactive Content Engine (ICE) 100 implemented according to an exemplary embodiment of the present invention. Portions not applicable for a full and complete understanding of the present invention are not shown for purposes of clarity. The ICE 100 includes an appropriate multiple-port (or multiport) Gigabit Ethernet (GbE) switch 101 as the backplane fabric having multiple Ethernet ports coupled to a number of Storage Processor Nodes (SPNs) 103. Each SPN 103 is a simplified server including two Gigabit Ethernet ports, one or more processors 107, memory 109 (.e.g., random access memory (RAM)), and an appropriate number (e.g., four to eight) disk drives 111. A first Gb port 105 on each SPN 103 connects to a corresponding port of the switch 101 for full duplex operation (simultaneous transmission and reception at each SPN/port connection), and is used for moving data within the ICE 100. The other Gb port (not shown) delivers the content output to downstream users (not shown).

Each SPN 103 has high speed access to its local disk drives and to the other disk drives of the other four SPNs in each group of five SPNs. The switch 101 is a backplane for the ICE 100 instead of just a communication device between SPNs 103. Only five SPNs 103 are shown for purposes of illustration, where it is understood that the ICE 100 typically includes a larger number of servers. Each SPN 103 acts as storage, processing, and transmitter of content. In the configuration shown, each SPN 103 is configured using off-the-shelf components, and is not a computer in the usual sense. Although standard operating systems are contemplated, such interrupt driven operating systems may pose unnecessary bottlenecks.

Each title (e.g., video, movie or other media content) is not wholly stored on any single disk drive 111. Instead, the data for each title is divided and stored among several disk drives within the ICE 100 to achieve the speed benefits of interleaved access. The content of a single title is spread across multiple disk drives of multiple SPNs 103. Short "time frames" of title content are gathered in a round robin fashion from each drive in each SPN 103. In this manner, the physical load is spread escaping the drive count limits of SCSI and IDE, a form of fail-safe operation is gained, and a large set of titles are organized and managed.

In the particular configuration shown, each content title is divided into discrete chunks of a fixed size (typically about 2 megabytes (MB) per chunk). Each chunk is stored on a different set of SPNs 103 in a round robin fashion. Each chunk is divided into four subchunks, and fifth subchunk representing the parity is created. Each subchunk is stored on a disk drive of a different SPN 103. In the configuration shown and described, the subchunk size of about 512 kilobytes (KB) (where "K" is 1024) matches the nominal unit of data of each of the disk drives 111. The SPNs 103 are grouped five at a time, and each group or SPN set stores a chunk of data of a title. As shown, the five SPNs 103 are labeled 1-4 and "Parity", which collectively store a chunk 113 as five separate subchunks 113a, 113b, 113c, 113d and 113e stored on the SPNs 1, 2, 3, 4 and Parity, respectively. The subchunks 113a-113e are shown stored in a distributed manner on a different drive for each different SPN (e.g., SPN1/DRIVE1, SPN2/DRIVE2, SPN3/DRIVE3, etc.), but may be stored in any other possible combination (e.g., SPN1/DRIVE1, SPN2/DRIVE1, SPN3/DRIVE3, etc.) The subchunks 1-4 comprise the data and the subchunk Parity comprises the parity information for the data subchunks. The size of each SPN set, while typically five, is arbitrary and could just as easily be any other suitable number, such as, for example, 2 SPNs to 10 SPNs. Two SPNs would use 50% of their storage for redundancy, ten would use 10%. Five is a compromise between efficiency of storage and probability of failure.

By distributing content in this fashion, at least two goals are achieved. First, the number of users that can view a single title is not limited to the number which can be served by a single set of SPNs, but by the bandwidth of all the sets of SPNs taken together. Therefore, only one copy of each content title is required. The tradeoff is the limitation in the number of new viewers for a given title that can be launched each second, which is far less of a constraint than the wasted space and management overhead of redundant storage. A second goal is the increase in overall reliability of the ICE 100. The failure of a single drive is masked by the real time regeneration of its content using the parity drive, similar to a redundant array of independent disks (RAID). The failure of an SPN 103 is masked by the fact that it contains one drive from each of several RAID sets, each of which continues to operate. The users connected to a failed SPN are very quickly taken over by shadow processes running on other SPNs. In the event of failure of a disk drive or of an entire SPN, the operator is notified to repair or replace the failed equipment. When a missing subchunk is rebuilt by the user process, it is transmitted back to the SPN that would have provided it, where it is cached in RAM (as it would have been had it been read from the local disk). This avoids wasting the time of other user processes in doing the same rebuild for a popular title, as subsequent requests will be filled from RAM as long as that subchunk is popular enough to remain cached.

The goal of a user process (UP) running on each "user" SPN 103 is to gather the subchunks from its own disk plus the corresponding four subchunks from other user SPNs to assemble a chunk of video content for delivery. User SPNs are distinguished from one or more management MGMT SPNs, which are configured in the same manner but perform different functions, as further described below. A pair of redundant MGMT SPNs is contemplated to enhance reliability and performance. The gathering and assembling functions performed by each UP is done many times on behalf of many users on each user SPN 103. As a consequence, there is a significant amount of data traffic going between the user SPNs 103. The typical Ethernet protocol, with packet collision detection and retries, would otherwise be overwhelmed. Typical protocols are designed for random transmissions, and depend on slack time between those events. So this approach is not used. In the ICE 100, collisions are avoided by using a full duplex, fully switched architecture, and by managing bandwidth carefully. Most communication is done synchronously. The switch 101 itself is managed in a synchronous manner, as further described below, so that the transmissions are coordinated. Since it is determined which SPN 103 gets to transmit and when, ports are not overwhelmed with more data than they can handle during a given period. Indeed, data is first gathered in the memory 109 of user SPNs 103 and then its transfer is managed synchronously. As part of the orchestration, there are status signals between the user SPNs 103. Unlike the actual content going to the end user, the data size for signaling between the user SPN units is quite small.

The length of each subchunk (about 512K bytes, where "K" is 1024) would otherwise overwhelm any buffering available in the GbE switch 101 if the transmission of subchunks were allowed to be done randomly or asynchronously. The period for transmitting this much information is about 4 milliseconds (ms), and it is desired to make sure that several ports do not try and transmit to a single port simultaneously. Therefore, as further described below, the switch 101 is managed in a manner that causes it to operate synchronously, with all ports fully utilized under full load conditions.

The redundant directory process which manages the file system (or, virtual file system or VFS) is responsible for reporting where a given content title is stored when it is requested by a user. It is also responsible for allocating the required storage space when a new title is to be loaded. All allocations are in integral chunks, each of which is composed of five subchunks. Space on each disk drive is managed within the drive by Logical Block Address (LBA). A subchunk is stored on a disk drive in contiguous sectors or LBA addresses. The capacity of each disk drive in the ICE 100 is represented by its maximum LBA address divided by the number of sectors per subchunk.

Each title map or "directory entry" contains a list indicating where the chunks of its title are stored, and more specifically, where each subchunk of each chunk is located. In the illustrated embodiment, each item in the list representing a subchunk contains an SPNID identifying a specific user SPN 103, a disk drive number (DD#) identifying a specific disk drive 111 of the identified user SPN 103, and a subchunk pointer (or Logical Block Address or LBA) packed as a 64-bit value. Each directory entry contains a subchunk list for about half an hour of content at the nominal 4 Mbsp. This is equal to 450 chunks, or 2250 subchunks. Each directory entry is about 20 KB with ancillary data. When a UP executing on an SPN requests a directory entry, the entire entry is sent and stored locally for the corresponding user. Even if an SPN supports 1,000 users, only 20 MB of memory is consumed for the local lists or directory entries.

The ICE 100 maintains a database of all titles available to a user. This list includes the local optical disk library, real time network programming, and titles at remote locations where license and transport arrangements have been made. The database contains all the metadata for each title, including management information (licensing period, bit rate, resolution, etc.) as well as information of interest to the user (producer, director, cast, crew, author, etc.). When the user makes a selection, a directory of a virtual file system (VFS) 209 (FIG. 2) is queried to determine if the title is already loaded in the disk array. If not, a loading process (not shown) is initiated for that piece of content, and the UP is notified if necessary as to when it will be available for viewing. In most cases, the latency is no more than the mechanical latency of the optical disk retrieval robot (not shown), or about 30 seconds.

Information stored on the optical disk (not shown) includes all metadata (which is read into the database when the disk is first loaded into the library), as well as the compressed digital video and audio representing the title and all information that can be gleaned in advance about those data streams. For example, it contains pointers to all relevant information in the data streams such as clock values and time stamps. It is already divided into subchunks, with the parity subchunk pre-calculated and stored on the disk. In general, anything which can be done in advance to save loading time and processing overhead is included on the optical disk.

Included in the resource management system is a dispatcher (not shown) which a UP consults to receive a start time for its stream (usually within milliseconds of the request). The dispatcher insures that the load on the system remains even, that latency is minimized, and that at no time does the bandwidth required within the ICE 100 exceed that which is available. When ever a user requests a stop, pause, fast forward, rewind, or other operation which interrupts the flow of their stream, its bandwidth is de-allocated and a new allocation made for any new service requested (e.g., a fast forward stream).

Figure 2:
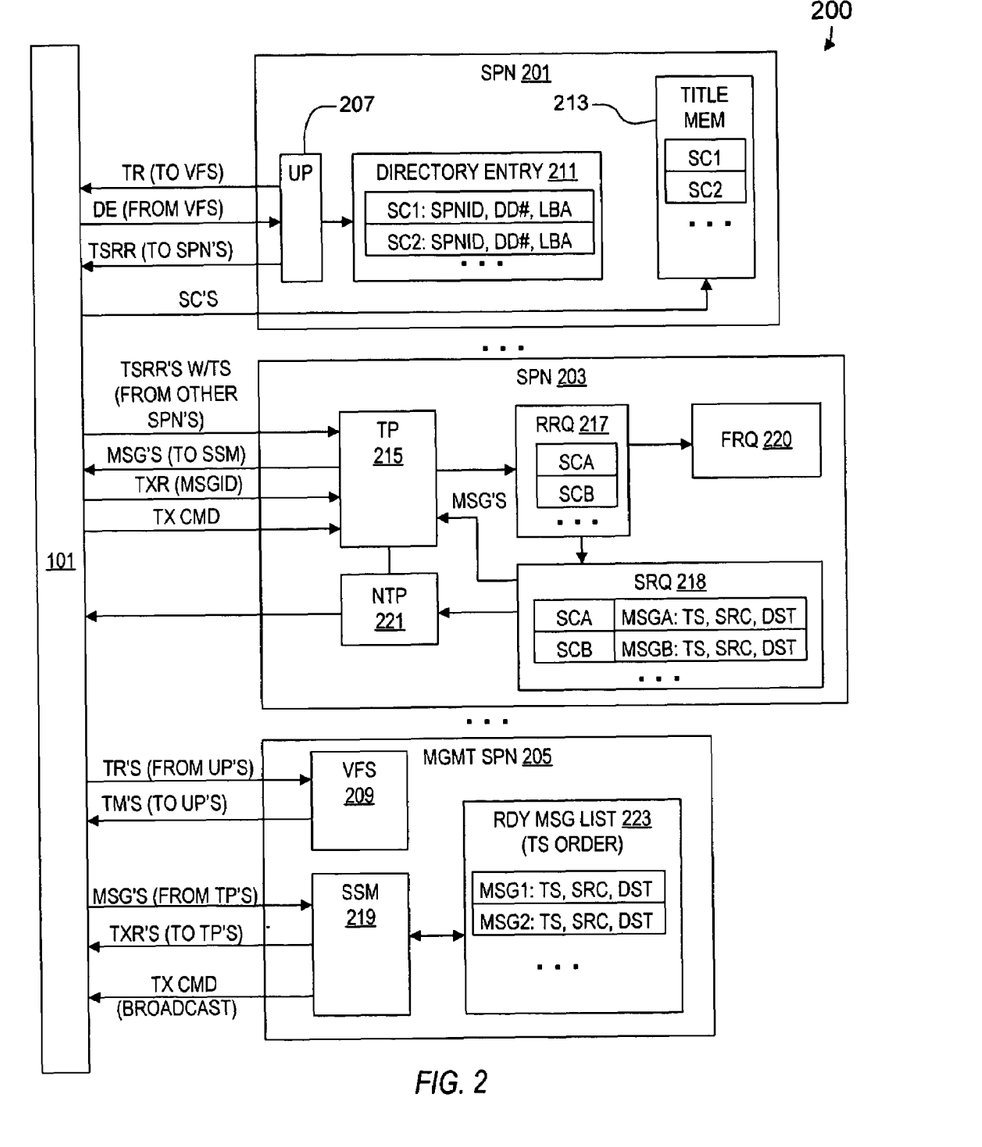
FIG. 2 is a logical block diagram of a portion of the ICE of FIG. 1 illustrating a synchronized data transfer system implemented according to an embodiment of the present invention.

FIG. 2 is a logical block diagram of a portion of the ICE 100 illustrating a synchronized data transfer system 200 implemented according to an embodiment of the present invention. The switch 101 is shown coupled to several exemplary SPNs 103, including a first user SPN 201, a second user SPN 203, and a management (MGMT) SPN 205. As previously noted, many SPNs 103 are coupled to the switch 101 and only two user SPNs 201, 203 are shown for illustrating the present invention and are physically implemented just as any SPN 103 as previously described. The MGMT SPN 205 is physically implemented just like any other SPN 103, but generally performs management functions rather than the specific user functions. The SPN 201 illustrates certain functions and the SPN 203 illustrates other functions of each user SPN 103. It is understood, however, that each user SPN 103 is configured to perform similar functions so that the functions (and processes) described for the SPN 201 are also provided on the SPN 203 and vice-versa.

As previously described, the switch 101 operates at 1 Gbps per port, so that each subchunk (about 512 KB) takes about 4 ms to pass from one SPN to another. Each user SPN 103 executes one or more user processes (UPs), each for supporting a downstream user. When a new chunk of a title is needed to refill a user output buffer (not shown), the next five subchunks from the list are requested from the other user SPNs storing those subchunks. Since many UPs potentially request multiple subchunks substantially at the same time, the subchunk transmission duration would otherwise overwhelm the buffering capacity of almost any GbE switch for a single port, let alone for the whole switch. This is true for the illustrated switch 101. If subchunk transmission is not managed, it would result in potentially all five subchunks for each UP being returned simultaneously, overwhelming the output port bandwidth. It is desired to tighten the timing of the transmissions of SPNs of the ICE 100, so that the most critical data is transmitted first, and intact.

The SPN 201 is shown executing a UP 207 for servicing a corresponding downstream user. The user requests a title (e.g., a movie), which request is forwarded to the UP 207. The UP 207 transmits a title request (TR) to the VFS 209 (described further below) located on the MGMT SPN 205. The VFS 209 returns a directory entry (DE) to the UP 207, which locally stores the DE shown at 211. The DE 211 includes a list locating each subchunk of the title (SC1, SC2, etc.), each entry including the SPNID identifying a specific user SPN 103, the disk drive number (DD#) identifying a specific disk drive 111 of the identified SPN 103, and an address or LBA providing the specific location of the subchunk on the identified disk drive. The SPN 201 initiates a time stamped read request (TSRR) for each subchunk in the DE 211, one at a time. In the ICE 100, the requests are made immediately and directly. In other words, the SPN 201 begins making the requests for the subchunks immediately and directly to the specific user SPNs 103 storing the data. In the configuration shown, the requests are made in the same manner even if locally stored. In other words, even if the requested subchunk resides on a local disk drive of the SPN 201, it sends out the request via the switch 201 as though remotely located. The network is the location that may be configured to recognize that a request is being sent from an SPN to the same SPN. It is simpler to handle all cases the same especially in larger installations in which it is less likely that the request will actually be local.

Although the requests are sent out immediately and directly, the subchunks are each returned in a fully managed manner. Each TSRR is to the specific user SPN using the SPNID, and includes the DD# and LBA for the target user SPN to retrieve and return the data. The TSRR may further include any other identification information sufficient to ensure that the requested subchunk is properly returned to the appropriate requestor and to enable to the requestor to identify the subchunk (e.g., UP identifier to distinguish among multiple UP's executing on the destination SPN, a subchunk identifier to distinguish among the subchunks for each data chunk, etc.) Each TSRR also includes a timestamp (TS) identifying the specific time when the original request is made. The TS identifies the priority of the request for purposes of synchronous transmission, where priority is based on time such that earlier requests assume higher priority. When received, the returned subchunks of the requested title are stored in a local title memory 213 for further processing and delivery to the user which requested the title.

The user SPN 203 illustrates operation of a transfer process (TP) 215 and supporting functions executing on each user SPN (e.g., 201, 203) for receiving TSRRs and for returning the requested subchunks. The TP 215 includes or is otherwise interfaced with a storage process (not shown) which interfaces the local disk drives 111 on the SPN 203 for requesting and accessing the stored subchunks. The storage process may be implemented in any desired manner, such as a state machine or the like, and may be a separate process interfaced between the TP 215 and the local disk drives 111 as known to those skilled in the art. As shown, the TP 215 receives one or more TSRRs from one or more UPs executing on the other user SPNs 103 and stores each request in a read request queue (RRQ) 217 in its local memory 109. The RRQ 217 stores a list of requests for subchunks SCA, SCB, etc. The disk drive storing the requested subchunks removes the corresponding requests from the RRQ 217, sorts them in physical order, and then executes each read in the sorted order. Accesses to subchunks on each disk is managed in groups. Each group is sorted in physical order according to "elevator seek" operation (one sweep from low to high, next sweep from high to low, etc., so that the disk head sweeps back and forth across the disk surface pausing to read the next sequential subchunk). Requests for successful reads are stored in a successful read queue (SRQ) 218 sorted in TS order. Requests for failed reads (if any) are stored in a failed read queue (FRQ) 220 and failed information is forwarded to a network management system (not shown) that determines the error and the appropriate corrective action. It is noted that in the configuration illustrated, the queues 217, 218 and 220 store request information rather than the actual subchunks.

Each subchunk that is successfully read is placed in memory reserved for an LRU cache of recently requested subchunks. For each retrieved subchunk, the TP 215 creates a corresponding message (MSG), which includes the TS for the subchunk, the source (SRC) of the subchunk (e.g., the SPNID from which the subchunk is being transmitted and its physical memory location along with any other identifying information), and the destination (DST) SPN to which the subchunk is to be transmitted (e.g., the SPN 201). As shown, the SRQ 218 includes messages MSGA, MSGB, etc., for subchunks SCA, SCB, etc., respectively. After the requested subchunks are read and cached, the TP 215 sends corresponding MSGs to a synchronized switch manager (SSM) 219 executing on the MGMT SPN 205.

The SSM 219 receives and prioritizes multiple MSGs received from TPs from user SPNs and eventually sends a transmit request (TXR) to the TP 215 identifying one of the MSGs in its SRQ 218, such as using a message identifier (MSGID) or the like. When the SSM 219 sends a TXR to the TP 215 with a MSGID identifying a subchunk in the SRQ 218, the request listing is moved from the SRQ 218 to a network transfer process (NTP) 221, which builds the packets used to transfer the subchunk to the destination user SPN (where "moved" denotes removing the request from the SRQ 218). The order in which subchunk request listings are removed from the SRQ 218 is not necessarily sequential, in spite of the list being in timestamp order, as only the SSM 219 determines the proper ordering. The SSM 219 sends one TXR to every other SPN 103 having at least one subchunk to send unless the subchunk is to be sent to a UP on an SPN 103 already scheduled to receive an equal or higher priority subchunk, as further described below. The SSM 219 then broadcasts a single transmit command (TX CMD) to all user SPNs 103. The TP 215 instructs the NTP 221 to transmit the subchunk to the requesting UP of the user SPN 103 in response to the TX CMD command broadcasted by the SSM 219. In this manner, each SPN 103 having received a TXR from the SSM 219 simultaneously transmits to another requesting user SPN 103.

The VFS 209 on the MGMT SPN 205 manages the list of titles and their locations in the ICE 100. In typical computer systems, directories (data information) usually resides on the same disk on which the data resides. In the ICE 100, however, the VFS 209 is centrally located to manage the distributed data since data for each title is distributed across multiple disks in the disk array, which are in turn distributed across multiple user SPNs 103. As previously described, the disk drives 111 on the user SPNs 103 primarily store the subchunks of the titles. The VFS 209 includes identifiers for the location of each subchunk via SPNID, DD#, and the LBA as previously described. The VFS 209 also includes identifiers for other parts of the ICE 100 that are external, such as the optical storage. When a user requests a title, a full set of directory information (ID's/addresses) is made available to the UP executing on the user SPN 103 that accepted the user's request. From there, the task is to transfer subchunks off of disk drives to memory (buffers), moving them via the switch 101 to the requesting user SPN 103, which assembles a full chunk in a buffer, delivers it to the user, and repeats until done.

The SSM 219 creates a list of "ready" messages in timestamp order in a ready message (RDY MSG) list 223. The order in which the messages are received from the TPs on the user SPNs 103 are not necessarily in timestamp order, but are organized in TS order in the RDY MSG list 223. Just before the next set of transfers, the SSM 219 scans the RDY MSG list 223 starting with the earliest time stamp. The SSM 219 first identifies the earliest TS in the RDY MSG list 223 and generates and sends the corresponding TXR message to the TP 215 of the user SPN 103 storing the corresponding subchunk to initiate a pending transfer of that subchunk. The SSM 219 continues scanning the list 223 for each subsequent subchunk in TS order generating the TXR messages for each subchunk whose source and destination are not already involved in a pending subchunk transfer. For each TX CMD broadcast to all of the user SPNs 103, each user SPN 103 only transmits one subchunk at a time and only receives one subchunk at a time, although it can do both simultaneously. For example, if a TXR message is sent to the TP of SPN #10 to schedule a pending subchunk transfer to SPN #2, then SPN #10 cannot simultaneously send another subchunk. SPN #10 can, however, simultaneously receive a subchunk from another SPN. Furthermore, the SPN #2 cannot simultaneously receive another subchunk while receiving the subchunk from SPN

10, although the SPN #2 can simultaneously transmit to another SPN because of the full duplex nature of each of the ports of the switch 101.

The SSM 219 continues scanning the RDY MSG list 223 until all user SPNs 103 have been accounted for, or when the end of the RDY MSG list 223 is reached. Each entry in the RDY MSG list 223 corresponding to a TXR message is eventually removed from the RDY MSG list 223 (either when the TXR message is sent or after the transfer is completed). When the last transfer of the previous period has finished, the SSM 219 broadcasts a TX CMD packet which signals all user SPNs 103 to begin the next round of transmissions. Each transfer occurs synchronously within a period of approximately 4 to 5 ms for the specific configuration illustrated. During each transfer round, additional MSGs are sent to the SSM 219 and new TXR messages are sent out to the user SPNs 103 to schedule the next round of transmissions, and the process is repeated. The period between successive TX CMDs is approximately equal to the period necessary to transmit all of the bytes of a subchunk, including packet overhead and inter-packet delay, plus a period to clear all caching that may have occurred in the switch during the transmission of the subchunk, typically 60 microseconds (µs), plus a period to account for any jitter caused by a delay in recognition of the TX CMD by an individual SPN, typically less than 100 µs.

In one embodiment, a duplicate or mirrored MGMT SPN (not shown) mirrors the primary MGMT SPN 205, so that the SSM 219, the VFS 209, and the dispatcher are each duplicated on a pair of redundant dedicated MGMT SPNs. In one embodiment, the synchronizing TX CMD broadcast acts as a heartbeat indicating the health of the MGMT SPN 205. The heartbeat is a signal to the secondary MGMT SPN that all is well. In the absence of the heartbeat, the secondary MGMT SPN takes over all management functions within a predetermined period of time, such as, for example, within 5 ms.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention as defined by the following claims.

The invention claimed is:

1. A method of synchronously transferring distributed subchunks of data between a plurality of processor nodes coupled to a network switch, said method comprising:
   periodically broadcasting, by a management process executed on at least one of the processor nodes to each of the plurality of processor nodes via the network switch, a transmit command to initiate each of a plurality of sequential transmit periods;
   sending to the management process, by each processor node having at least one subchunk to send, a message for each subchunk to be sent, each message identifying a source processor node and a destination processor node;
   selecting, by the management process, at least one message received from the processor nodes to ensure that each processor node scheduled to send at least one subchunk sends only one subchunk during a following transmit period and that each processor node scheduled to receive at least on subchunk receives only one subchunk during the following transmit period;
   sending, by the management process, a plurality of transmit requests, each transmit request sent to a processor node that had sent a corresponding message that was selected; and
   transmitting, by each processor node receiving a transmit request, a subchunk identified by the received transmit request to a destination processor node in response to the following transmit command.

2. The method of claim 1, further comprising:
   prior to said sending a message for each subchunk to be sent, timestamping each message;
   said selecting comprising prioritizing based on timestamp order; and
   said sending a plurality of transmit requests comprising sending transmit requests in timestamp order.

3. The method of claim 2, further comprising:
   sending, by at least one processor node, a plurality of timestamped read requests; and
   wherein said timestamping each message comprises incorporating a timestamp from a received timestamped read request into a corresponding message.

4. The method of claim 3, further comprising:
   organizing, by the management process, received messages into a ready message list in timestamp order; and
   scanning, by the management process, the ready message list in timestamp order just prior to each transmit period.

5. The method of claim 4, wherein said scanning comprises selecting a message if the identified source processor node has not already been selected for transmitting a subchunk during the following transmit period and if the identified destination processor node has not already been selected for receiving a subchunk during the following transmit period.

6. The method of claim 5, wherein said scanning is completed when the entire ready message list has been scanned, or if all of the processor nodes have been selected to transmit a subchunk or if all of the processor nodes have been selected to receive a subchunk.

7. The method of claim 1, further comprising:
   storing received subchunk read requests into a read request queue, each subchunk read request indicating a request for a locally stored subchunk;
   reading, by a local disk drive, subchunks identified in the read request queue in physical order;
   listing entries of subchunks read successfully into a successful read queue; and
   said sending a message for each subchunk to be sent comprising sending a message for each entry in said successful read queue.

8. The method of claim 7, wherein each subchunk read request comprises a timestamped read request, wherein said listing entries of subchunks read successfully into a successful read queue comprises listing entries in timestamp order, and wherein said sending a message for each entry in said successful read queue comprises sending messages in timestamp order.

9. The method of claim 7, further comprising:
   removing an entry from the successful request queue that is associated with a subchunk identified by a corresponding transmit request; and
   building network packets used to transfer the identified subchunk to a destination processor node in response to a transmit command.

10. The method of claim 1, further comprising executing the management processor on a first management node and executing a mirrored management process on a mirrored management node which mirrors the first management node.

11. A synchronized data transfer system, comprising:
a plurality of storage processor nodes including first and second user nodes and a management node;
a backbone communication switch coupled to said plurality of storage processor nodes;
a plurality of titles each subdivided into a plurality of subchunks which are distributed across said plurality of storage processor nodes;
a user process, executed on said first user node, which sends a plurality of timestamped read requests, each timestamped read request for requesting a corresponding subchunk;
a transfer process, executed on said second user node, which sends a message to a management process for each received timestamped read request requesting a locally stored subchunk, each message including a source node identifier and a destination node identifier; and
a said management process, executed on said management node, which periodically broadcasts a transmit command to said plurality of storage processor nodes via said switch to initiate each of a plurality of sequential transmit periods, which receives a plurality of messages, and, prior to each transmit period, which selects at least one of said plurality of messages to ensure that each storage processor node sends no more than one subchunk and receives no more than one subchunk during each transmit period in which at least one subchunk is transferred, and which sends a plurality of transmit requests corresponding to selected messages; and
wherein said transfer process, in response to receiving a transmit request from said management process, sends a corresponding subchunk to a storage processor node identified by said destination node identifier during the next transmit period initiated by the next broadcasted transmit command.

12. The synchronized data transfer system of claim 11, wherein said management process selects from among said plurality of messages based on timestamp priority.

13. The synchronized data transfer system of claim 12, wherein said management process first selects a message with a highest priority timestamp and then selects each subsequent message if an identified source node has not already been selected for transmitting a subchunk during said following transmit period and if an identified destination node has not already been selected for receiving a subchunk during said following transmit period.

14. A synchronized data transfer system, comprising:
a plurality of processor nodes;
a backbone network switch coupled to said plurality of processor nodes to enable communication between said plurality of processor nodes;
a plurality of storage devices coupled to and distributed across said plurality of processor nodes and storing a plurality of titles, each title divided into a plurality of subchunks that are distributed across said plurality of storage devices;
a plurality of transfer processes, each executed on a corresponding one of said plurality of processor nodes and operative to send a message to a synchronous switch manager process for each subchunk that is to be transferred from a source processor node to a destination processor node, each message including a source node identifier and a destination node identifier; and
said synchronous switch manager process, executed on at least one of said plurality of processor nodes, which periodically broadcasts a transmit command to said plurality of processor nodes to initiate each of a plurality of sequential transmit periods, which receives a plurality of messages, and, prior to each transmit period, which selects at least one of said plurality of messages to ensure that each processor node sends no more than one subchunk and receives no more than one subchunk during each transmit period in which at least one subchunk is transferred, and which sends a plurality of transmit requests corresponding to selected messages; and
wherein each transfer process which sent at least one message and which received a transmit request from said synchronous switch manager process identifying a corresponding subchunk sends said corresponding subchunk to said destination processor node during the next transmit period initiated by a broadcasted transmit command.

15. The synchronized data transfer system of claim 14, wherein each of said plurality of messages comprises a timestamp and wherein said synchronous switch manager process prioritizes said plurality of messages based on timestamp order and sends said plurality of transmit requests in timestamp order.

16. The synchronized data transfer system of claim 15, further comprising:
a plurality of user processes, each executed on a corresponding one of said plurality of processor nodes and operative to send a plurality of timestamped read requests; and
wherein each transfer process incorporates a timestamp from a corresponding timestamped read request into a corresponding message.

17. The synchronized data transfer system of claim 16, wherein said synchronous switch manager process organizes said plurality of messages into a ready message list in timestamp order, scans said ready message list in timestamp order just prior to each of said plurality of sequential transmit periods, and selects messages based on timestamp priority.

18. The synchronized data transfer system of claim 17, wherein said synchronous switch manager process selects a message if an identified source processor node has not already been selected for transmitting a subchunk during a following transmit period and if an identified destination processor node has not already been selected for receiving a subchunk during said following transmit period.

19. The synchronized data transfer system of claim 14, further comprising:
each of said plurality of transfer processes storing received subchunk read requests into a read request queue, each subchunk read request indicating a locally stored subchunk;
each of said plurality of storage devices reading subchunks identified in a local read request queue in physical order;
each of said plurality of processor nodes listing subchunks read successfully by a corresponding storage device into a successful read queue; and
each of said plurality of transfer processes sending a message for each entry in a corresponding successful read queue to said synchronous switch manager process.

20. The synchronized data transfer system of claim 19, wherein each said subchunk read request comprises a timestamped read request, wherein entries in each said successful read queue are listed in timestamp order, and wherein each transfer process sends a message for each entry in a corresponding successful read queue in timestamp order.

21. The synchronized data transfer system of claim 19, further comprising:

each of said plurality of transfer processes removing an entry from a corresponding successful request queue in which said entry is associated with a subchunk identified by a corresponding transmit request; and a plurality of network transfer processes, each executed on a corresponding one of said plurality of processor nodes, and each operative to build network packets used to transfer an identified subchunk to a destination processor node in response to a transmit command.

22. The synchronized data transfer system of claim 14, wherein said network switch comprises a gigabit Ethernet switch with a plurality of ports, and wherein each of said plurality of processor nodes is coupled to a corresponding port of said network switch.

23. The synchronized data transfer system of claim 14, wherein said plurality of processor nodes includes a management node which executes said synchronous switch manager process.

24. The synchronized data transfer system of claim 14, wherein said plurality of processor nodes includes a first management node executing said synchronous switch manager process and a second management node executing a mirrored synchronous switch manager process.

\* \* \* \* \*

UNITED STATES PATENT AND TRADEMARK OFFICE
CERTIFICATE OF CORRECTION

| | | |
|---|---|---|
| PATENT NO. | : 7,788,396 B2 | Page 1 of 1 |
| APPLICATION NO. | : 10/999661 | |
| DATED | : August 31, 2010 | |
| INVENTOR(S) | : Steven W. Rose | |

It is certified that error appears in the above-identified patent and that said Letters Patent is hereby corrected as shown below:

Line 19 of claim 11 begins as "a said management process..."

Line 19 of claim 11 should be "said management process..."

The "a" should be deleted from the beginning of the clause.

Signed and Sealed this
Twenty-third Day of August, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,788,396 B2 | Page 1 of 1 |
| APPLICATION NO. | : 10/999661 | |
| DATED | : August 31, 2010 | |
| INVENTOR(S) | : Steven W. Rose | |

It is certified that error appears in the above-identified patent and that said Letters Patent is hereby corrected as shown below:

Column 11, line 19 (Claim 11, line 19) begins as "a said management process..."

should be -- said management process... --

This certificate supersedes the Certificate of Correction issued August 23, 2011.

Signed and Sealed this
Thirteenth Day of September, 2011

David J. Kappos
*Director of the United States Patent and Trademark Office*